(12) United States Patent
Uchida

(10) Patent No.: US 10,586,078 B2
(45) Date of Patent: Mar. 10, 2020

(54) DOCUMENT SYSTEM, CONTROL METHOD, AND STORAGE MEDIUM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/167,332

(22) Filed: Oct. 22, 2018

(65) Prior Publication Data
US 2019/0129925 A1   May 2, 2019

(30) Foreign Application Priority Data
Oct. 31, 2017 (JP) .................. 2017-211220

(51) Int. Cl.
| G06F 17/21 | (2006.01) |
| G06F 40/109 | (2020.01) |
| G06F 3/12 | (2006.01) |
| G06K 15/02 | (2006.01) |

(52) U.S. Cl.
CPC .......... *G06F 40/109* (2020.01); *G06F 3/1225* (2013.01); *G06K 15/02* (2013.01)

(58) Field of Classification Search
None
See application file for complete search history.

(56) References Cited

U.S. PATENT DOCUMENTS

| 2003/0002063 A1* | 1/2003 | Oomura ................. G06F 17/214 358/1.11 |
| 2006/0072137 A1* | 4/2006 | Nishikawa ............ G06F 17/214 358/1.11 |
| 2015/0153981 A1* | 6/2015 | Iwasaki ................. G06F 3/1238 358/1.14 |

FOREIGN PATENT DOCUMENTS

JP    2003-345787 A    12/2003

* cited by examiner

*Primary Examiner* — Frantz Bataille
(74) *Attorney, Agent, or Firm* — Canon U.S.A., Inc. IP Division

(57) ABSTRACT

A generation unit is configured to generate a document with a font embedded therein in a case where a determination unit determines that a parameter is an instruction to transmit the generated document to a print service system, and configured to generate a document without the font embedded therein in a case where the determination unit determines that the parameter is not an instruction to transmit the generated document to the print service system.

10 Claims, 19 Drawing Sheets

FIG.14

| DOCUMENT ID | PROCESSING STATUS | STORAGE PATH |
|---|---|---|
| 111 | PROCESSING | |
| 222 | GENERATION COMPLETED | /path2/yyy |
| 333 | ERROR | |
| ... | ... | ... |

FIG.16

| ID 1602 | NAME 1603 | BODY 1604 | SIZE 1605 | DESCRIPTION 1606 |
|---|---|---|---|---|
| aaa | 123.pdf | <DOCUMENT ENTITY> | 1024 | http://sample.com/print?documentid=111 |
| bbb | 456.pdf | <DOCUMENT ENTITY> | 512 | ⋮ |
| ⋮ | ⋮ | ⋮ | ⋮ | |

1601, 1607

DOCUMENT SYSTEM, CONTROL METHOD, AND STORAGE MEDIUM

BACKGROUND

Field

The present disclosure relates to a document system for creating a document based on data stored on a cloud, a method of controlling the same, and a storage medium.

Description of the Related Art

In recent years, cloud computing systems have begun to be widely used as mechanisms for managing business data and performing various kinds of processing on a server computer side. A user can access a Web page of a cloud server computer from a browser of a client computer via the Internet, and cause business data, which the user wants to view on the Web page, to be displayed on a display screen. If a document creation instruction is issued from the display screen, the user is redirected to a document generation server, and, on a screen returned from the document generation server, the user selects a form to be used for form overlay. The document generation server then acquires data on the cloud server, generates a document, transmits the document to the cloud server, or transmits the document to another service in cooperation. For example, another service in cooperation can be a print service, and the document can be transmitted to the print service to request the print service to print the document. A typical example of a cloud server is, for example, Salesforce CRM® of Salesforce.com, Inc. A storage provided by the cloud server is often restricted in capacity, so that it is desirable that the size of a document transmitted to the cloud server be small.

A Portable Document Format (PDF) is the most commonly used format of a document generated by a document generation server. When a PDF document is generated in a typical way, only a font name for drawing characters is specified, and font data itself is not included in the PDF document. Accordingly, if the PDF document is browsed in an environment different from the environment in which the PDF document was generated, unintended display result may be provided in a case where the font specified in the PDF document is not present in the browsing environment. The unintended display result may be, for example, layout changes or generation of a garbled character in the PDF document.

In order to deal with such issues, a technique for embedding font data in a generated PDF document exists. By embedding font data in a PDF document according to a previously fixed setting at the time of document generation, it is possible to obtain a consistent display regardless of the browsing environment (see Japanese Patent Application Laid-Open No. 2003-345787). Embedding font data in a PDF document increases the size of the PDF document as the number of fonts used in the PDF document increases.

SUMMARY OF THE INVENTION

According to various embodiments of the present disclosure, a document system including a client, a document generation service system configured to generate a document, and a print service system configured to cause a printer to print the document includes a determination unit configured to, in response to receiving a request for generating the document from the client, determine whether a parameter specified by the client is an instruction to transmit the generated document to the print service system, and a generation unit configured to generate the document with a font embedded therein in a case where the determination unit determines that the parameter is an instruction to transmit the generated document to the print service system, and configured to generate the document without the font embedded therein in a case where the determination unit determines that the parameter is not an instruction to transmit the generated document to the print service system.

Further features will become apparent from the following description of exemplary embodiments (with reference to the attached drawings).

BRIEF DESCRIPTION OF THE DRAWINGS

FIG. 14 is a diagram illustrating a table structure of a document information table according to one embodiment.

FIG. 16 is a diagram illustrating a table structure of an attachment table of the cloud platform service according to one embodiment.

DESCRIPTION OF THE EMBODIMENTS

In the related art, a setting as to whether font data is embedded in a generated document is fixed. In a case where font data is embedded in a document, transmission of the document to a cloud server consumes more storage capacity than in a case where font data is not embedded. On the other hand, in a case where font data is not embedded in the document, transmission of the document to a print service may result in unintended print output. As described above, according to the related art, a document suitable for an environment of a service to which the document is transmitted cannot be generated.

According to various embodiments of the present disclosure, while suppressing consumption of storage capacity when a document is transmitted to a cloud platform service, an intended print output result can be obtained when the document is transmitted to a print service to print the document.

Hereinafter, exemplary embodiments will be described with reference to the drawings.

Figure 1:
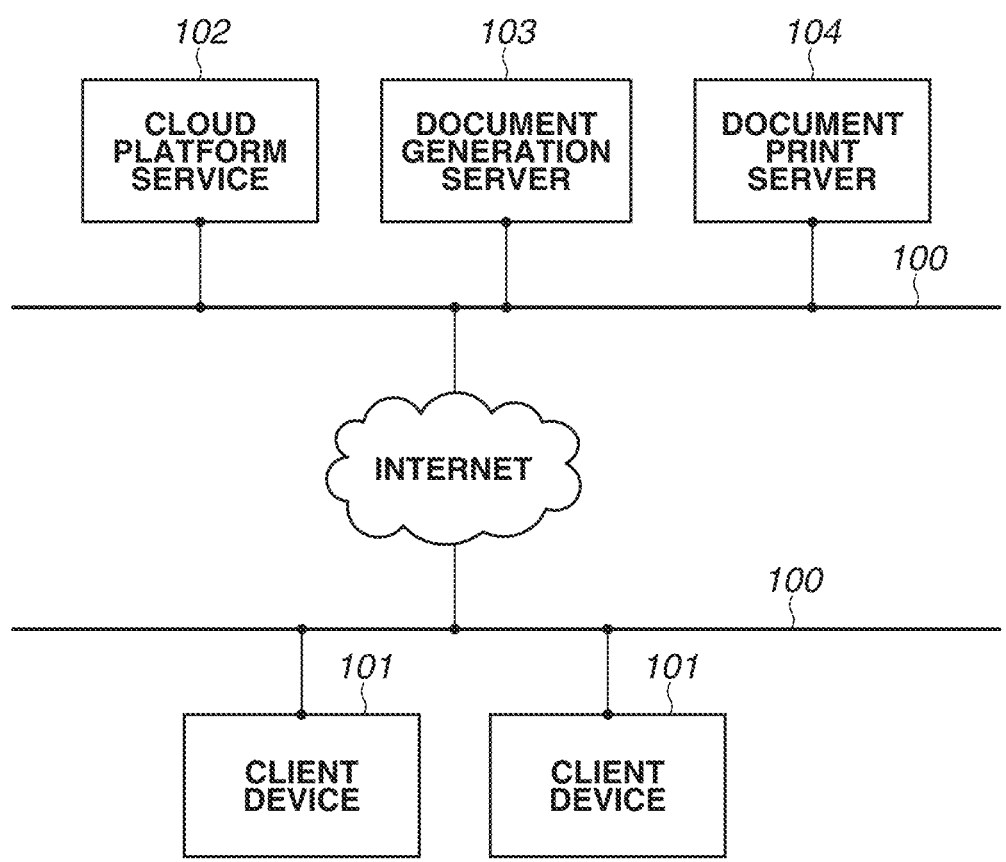
FIG. 1 is a block diagram illustrating a system configuration according to one embodiment.

FIG. 1 is a block diagram illustrating a system configuration of a document system according to a first exemplary embodiment. A client device 101 illustrated in FIG. 1 issues a request to a cloud platform service 102 to be described below and a document generation server 103 to be described below. The cloud platform service 102 illustrated in FIG. 1 is a service system that performs processing of data held by the cloud platform service 102 in response to a request from the client device 101 or the document generation server 103. The processing includes display and update of the data.

The document generation server 103 illustrated in FIG. 1 is a document generation service system that receives a request from the client device 101 and generates a document. A document print server 104 illustrated in FIG. 1 is a print service system that receives a document from the document generation server 103 and prints the document. Although the number of each server is one in FIG. 1, the number of each server can be more than one.

The respective components described above are communicably connected to each other by a network 100. The network can be, for example, a local area network (LAN) such as the Internet, a wide area network (WAN), a telephone line, a dedicated digital line, an asynchronous transfer mode (ATM), a frame relay line, a cable television line, or a data broadcasting radio line. Alternatively, the network can be a communication network realized by a combination of those.

The network can be anything that can transmit and receive data.

A communication function from the client device 101 to the cloud platform service 102 and the document generation server 103, a communication function from the document generation server 103 to the cloud platform service 102, and a communication function between the servers can be different.

Figure 2:
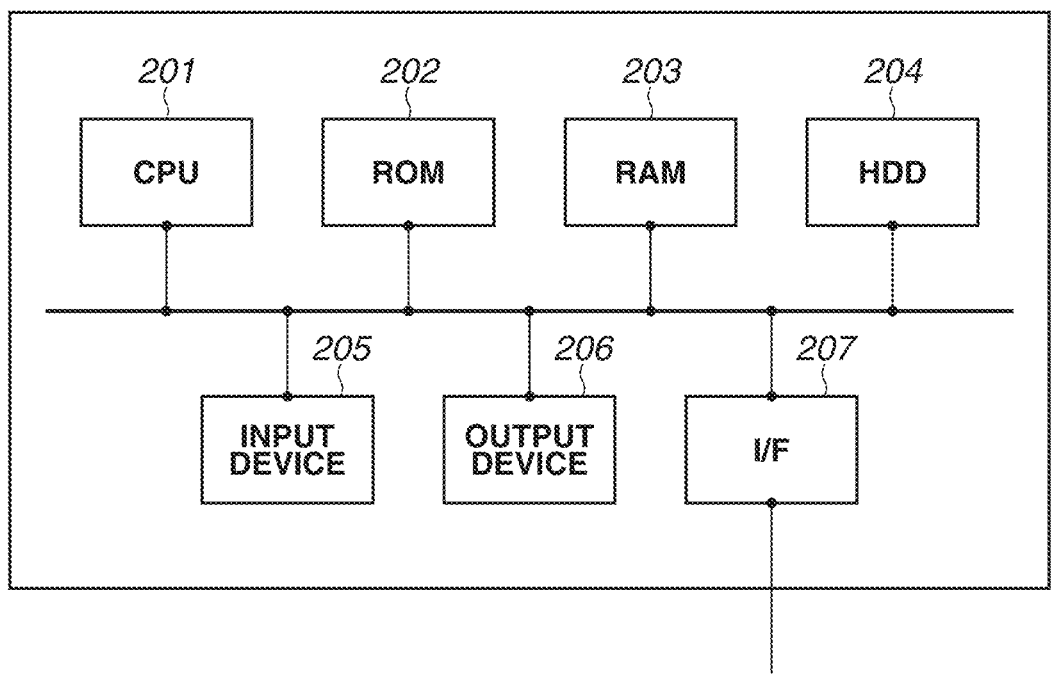
FIG. 2 is a diagram illustrating a hardware configuration according to one embodiment.

FIG. 2 is a block diagram illustrating a hardware configuration of each of the client device 101, the cloud platform service 102, the document generation server 103, and the document print server 104 in FIG. 1. A central processing unit (CPU) 201 illustrated in FIG. 2 directly or indirectly controls each device (a read only memory (ROM), a random access memory (RAM), etc. described below) connected by an internal bus and executes a program to realize the present exemplary embodiment. A ROM 202 stores a basic input/output system (BIOS). A RAM (direct storage device) 203 is used as a work area of the CPU 201 or used as a temporary storage for loading a software module for realizing the present exemplary embodiment. An indirect storage device 204 may be a hard disk drive (HDD) or a solid state drive (SSD) that stores an operating system (OS), which is basic software, and a software module. An input device 205 can be a keyboard or a pointing device (not illustrated). To an output device 206, a display is connected. An interface (I/F) 207 is used to connect the devices to the network 100.

In such hardware, the BIOS is executed by the CPU 201 after starting up, and the OS is loaded from the HDD 204 into the RAM 203 in an executable state. The CPU 201 loads various software modules to be described below from the HDD 204 into the RAM 203 in an executable state as required according to an operation of the OS. Various software modules are executed by the CPU 201 in cooperation with the devices described above. The I/F 207 is connected to the network 100, and is controlled by the CPU 201 according to the operation of the OS. Thus, communication by the above-described communication unit is realized.

Figure 3:
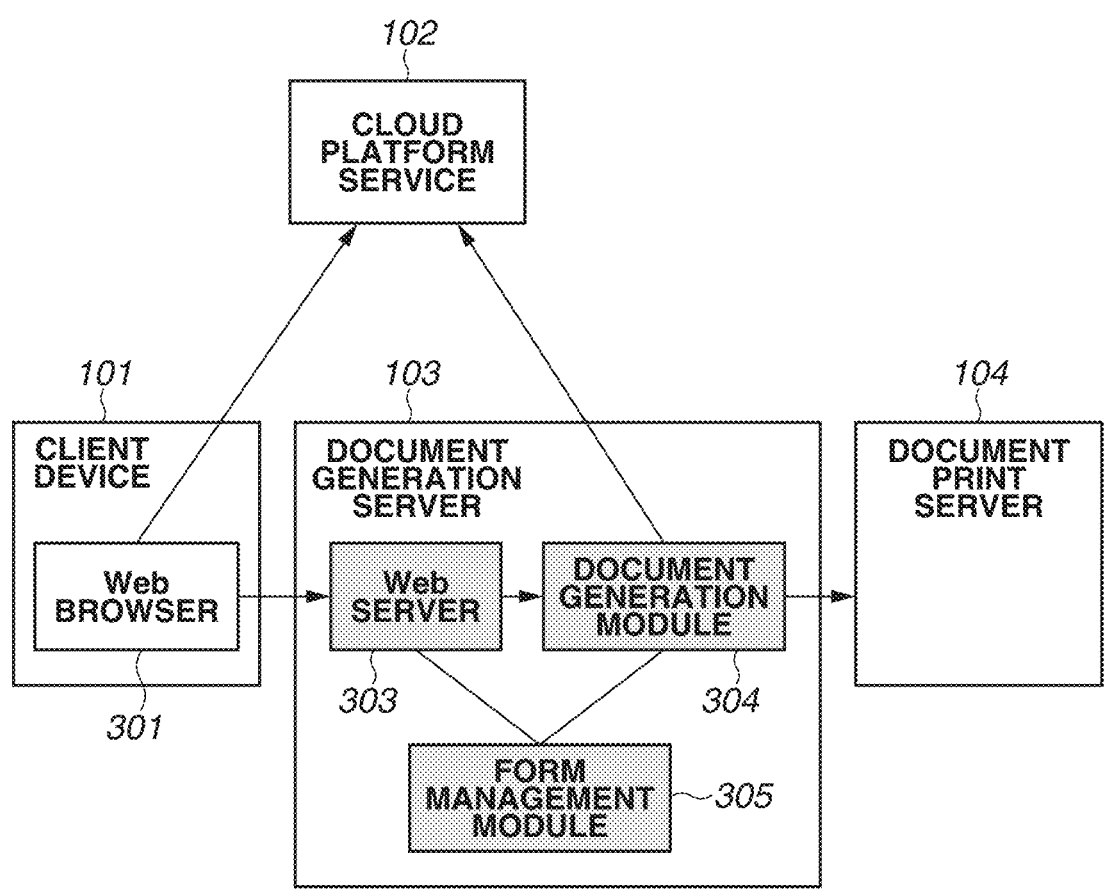
FIG. 3 is a diagram illustrating an overall configuration of a document generation system according to one embodiment.

FIG. 3 illustrates a configuration of a document generation system according to an exemplary embodiment. The client device 101 illustrated in FIG. 3 includes a Web browser 301 as a user interface application. The cloud platform service 102 manages users who use cloud platform services, business data, and settings used for redirection to the document generation server 103 to be described below.

The cloud platform service 102 performs, on the presupposition of multi-tenant, user management, business data management, and the like described above for each company or organization that uses the cloud platform service 102. The document generation server 103 includes a Web server 303, a document generation module 304, and a form management module 305. The Web server 303 is configured to have a function of a typical Web application, and the client device 101 can access the Web server 303 through the Web browser 301.

The Web server 303 returns user interface information in response to a request from the Web browser 301. The Web browser 301 renders the user interface information acquired from the Web server 303 and displays the rendered user interface information. The displayed user interface information includes, for example, a list of forms managed by the document generation server 103 to be described below, and an interface for making a document generation request. Upon receiving the document generation request from the Web browser 301, the Web server 303 transmits a document generation request to the document generation module 304 together with business data.

The document generation module 304 acquires business data to be an object of document generation from the cloud platform service 102, and performs overlay processing using both the acquired data and a form to generate document data. The document generation module 304 transmits the generated document to the document print server 104 and transmits a document print request.

The form management module 305 stores and manages form data. The form management module 305 manages query commands linked with forms. In a query command, a method for acquiring business data from the cloud platform service 102 and the like are set.

Figure 4:
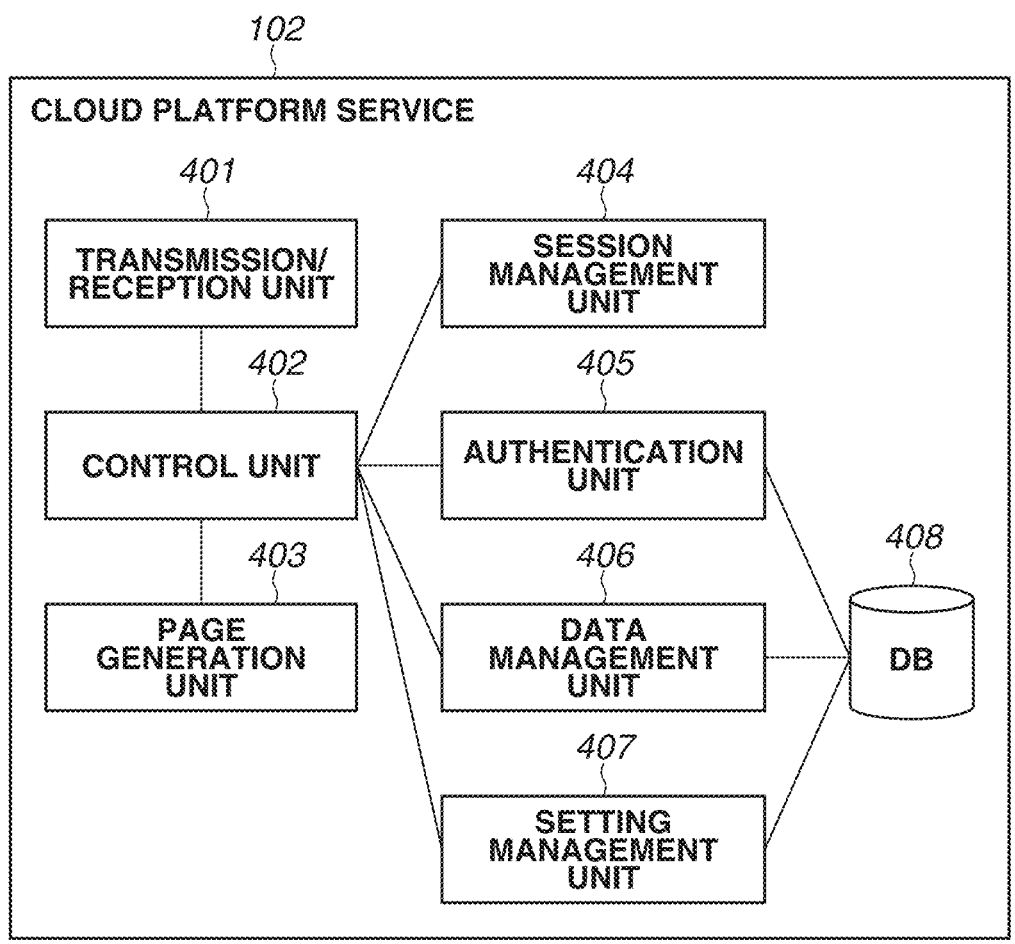
FIG. 4 is a block diagram of a software module of a cloud platform service according to one embodiment.

FIG. 4 is a block diagram of a software module running on the cloud platform service 102. Each software module is stored in the HDD 204 illustrated in FIG. 2, and loaded into the RAM 203 and executed by the CPU 201 as described above.

The cloud platform service 102 includes the components described below.

The cloud platform service 102 includes a transmission/reception unit 401 that processes communication with the Web browser 301 of the client device 101 and the document generation server 103, a control unit 402 that performs processing according to a request accepted by the transmission/reception unit 401, a page generation unit 403 that generates a Web page for returning a response to the Web browser 301, an authentication unit 405 that authenticates a user who has requested login, a session management unit 404 that manages session information of a user who succeeds in authentication by the authentication unit 405, a data management unit 406 that holds business data in a database (DB) 408 and acquires the business data from the DB 408 or updates the business data based on a request, and a setting management unit 407 that holds settings used for redirection to the document generation server 103. The cloud platform service 102 performs processing to be described below in cooperation of these components.

The DB 408 illustrated in FIG. 4 stores administrative user data and business data, which are stored in the HDD 204 illustrated in FIG. 2. The administrative user data and the business data are managed for each company/organization (hereinafter referred to as an organization). An organization identifier (ID) is automatically assigned to each organization, and each data item is managed together with the organization ID. In user authentication, an organization ID of an organization to which the user belongs is acquired and stored in the session management unit 404. Subsequent processing such as data acquisition is performed based on the organization ID. Thus, it is possible to refer only to data items with the matching organization ID.

The DB 408 also stores settings used for redirection to the document generation server 103. The business data and the settings used for redirection to the document generation server 103, which are stored in the DB 408, are set and updated by a user (administrator) at any timing via the Web browser 301.

Figure 5:
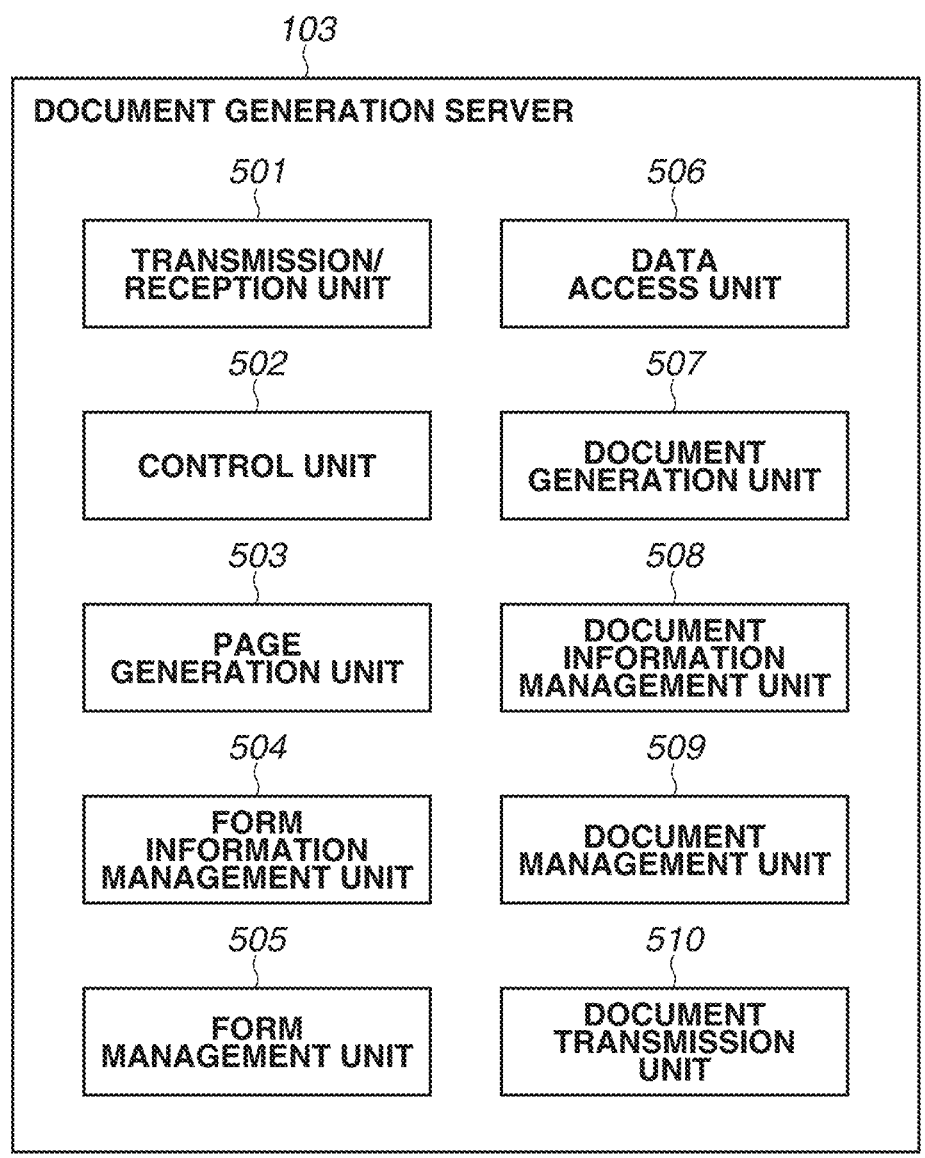
FIG. 5 is a block diagram of a software module of a document generation server according to one embodiment.

FIG. 5 is a block diagram of a software module running on the document generation server 103. Each software module is stored in the HDD 204 illustrated in FIG. 2, and loaded into the RAM 203 and executed by the CPU 201 as described above.

The document generation server 103 includes a transmission/reception unit 501 that processes communication with the Web browser 301 of the client device 101 and the cloud platform service 102, a control unit 502 that performs processing according to an accepted request, a page generation unit 503 that generates a Web page for returning a response to the Web browser 301, a form information management unit 504 that manages a form information table to be described below, a form management unit 505 that manages form data, a data access unit 506 that accesses the cloud platform service 102 to acquire business data, a document generation unit 507 that performs overlay processing using business data and a form to generate document data, a document information management unit 508 that manages a document information table to be described below, a document management unit 509 that stores the generated document data, and a document transmission unit 510 that transmits the document data to the cloud platform service 102 or the document print server 104. The document generation server 103 performs processing to be described below in cooperation of these components.

Figure 6:
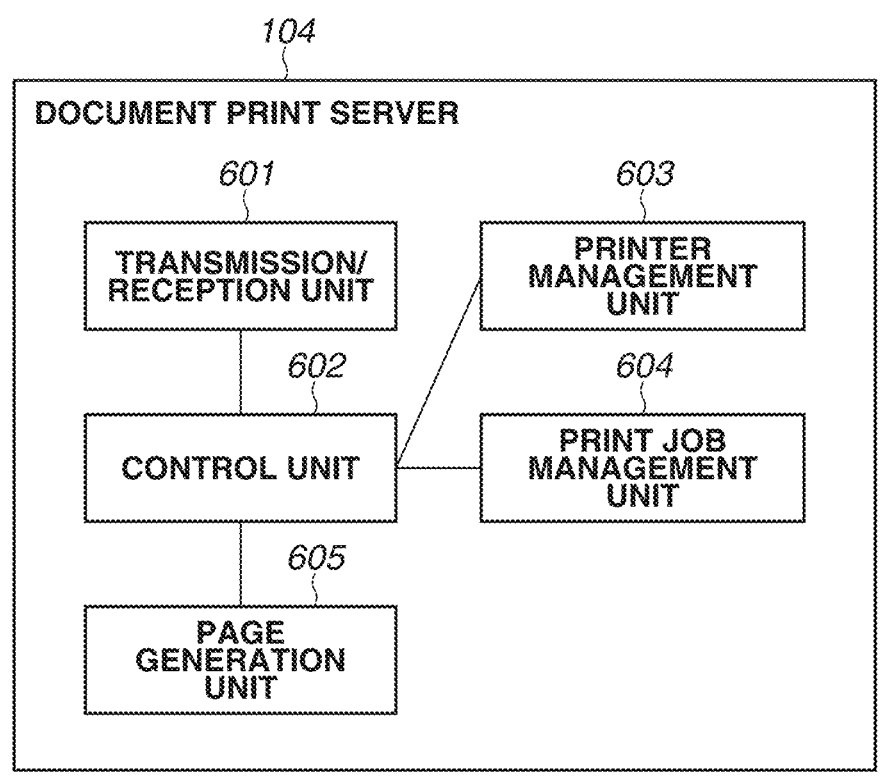
FIG. 6 is a block diagram of a software module of a document print server according to one embodiment.

FIG. 6 is a block diagram of a software module running on the document print server 104. Each software module is stored in the HDD 204 illustrated in FIG. 2, and loaded into the RAM 203 and executed by the CPU 201 as described above. The document print server 104 includes a transmission/reception unit 601 that processes communication with the Web browser 301 of the client device 101 and the document generation server 103, a control unit 602 that performs processing according to an accepted request, a printer management unit 603 that manages a registered printer, a print job management unit 604 that manages the progress of a print job, and a page generation unit 605 that generates a Web page for returning a response to the Web browser 301. Upon receiving a document from the document generation server 103, the control unit 602 creates a print job and transmits the print job to a printing apparatus (not illustrated) via the transmission/reception unit 601.

Figure 7:
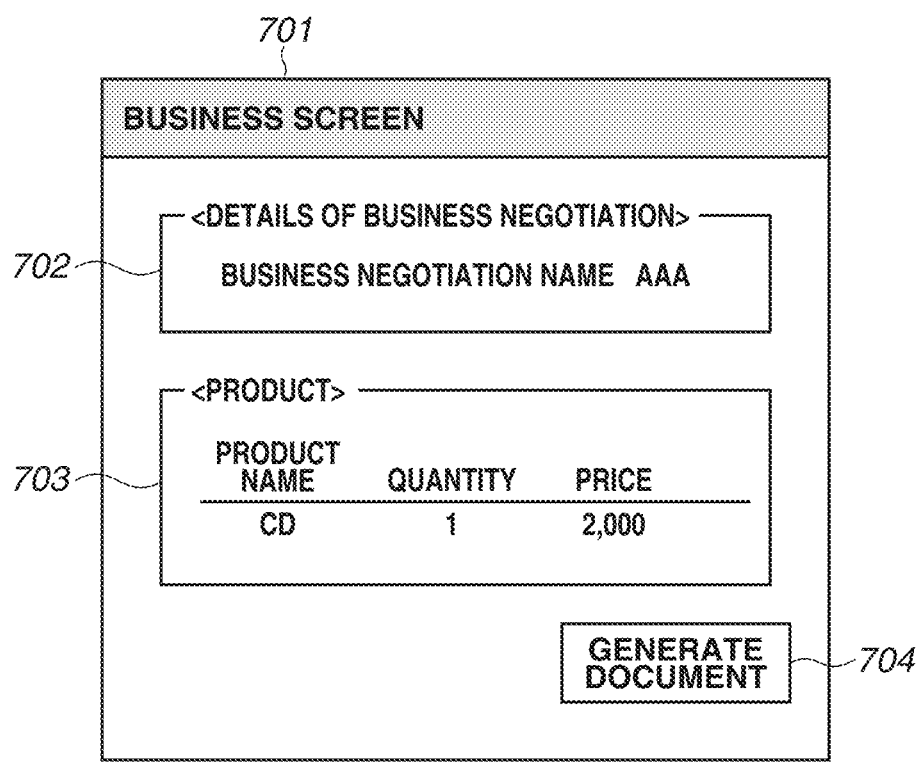
FIG. 7 is an example of a business screen of the cloud platform service according to one embodiment.

FIG. 7 illustrates an example of a business screen 701 when displaying business data by accessing the cloud platform service 102 from the Web browser 301 of the client device 101. FIG. 7 illustrates a state where a user has logged in to the cloud platform service 102. On the business screen 701, detailed information 702 and a product 703 of a certain record are displayed. In FIG. 7, the details of a business negotiation record are displayed on the business screen related to a business negotiation. A custom button 704 that has been set for redirection to the document generation server 103 is displayed. For the custom button 704, the user (administrator) can set an operation upon depression of the button, a screen on which the button is displayed, and the like as he/she likes. Thus, the custom button 704 is positioned on the screen by the user (administrator). The custom button 704 in FIG. 7 is a generate document button 903 in FIG. 9 to be described below.

Figure 8:
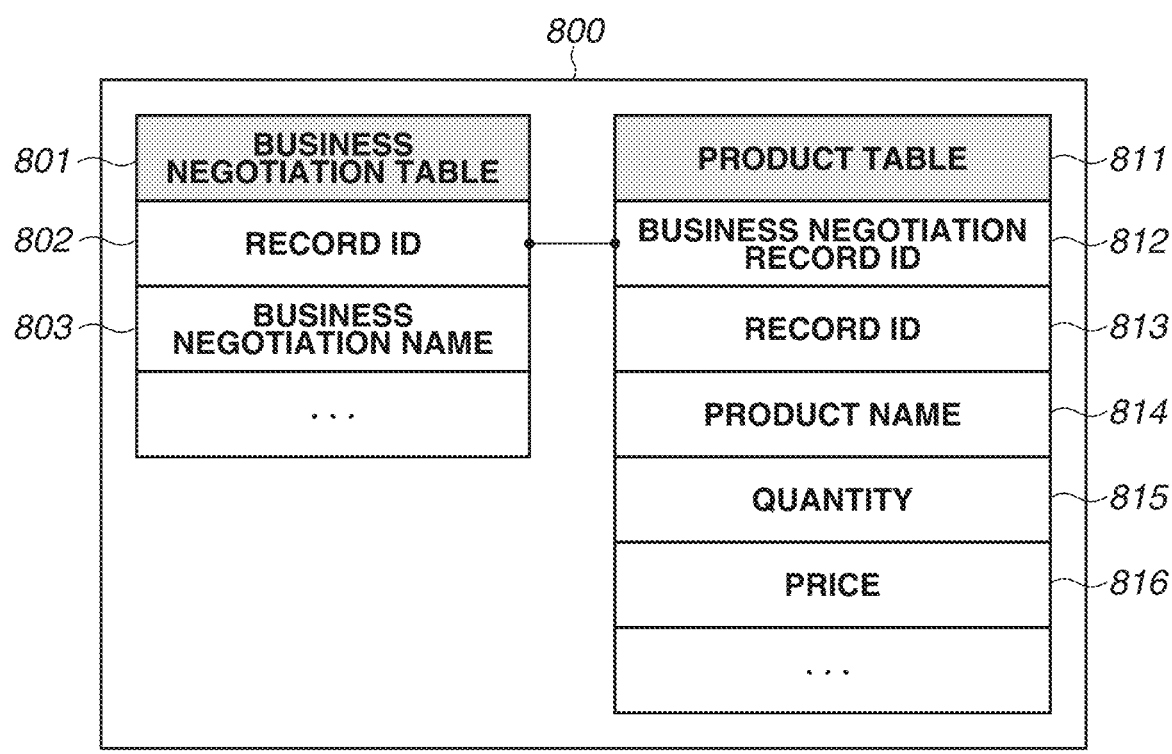
FIG. 8 is an example of a table structure of business data of the cloud platform service according to one embodiment.

FIG. 8 is a diagram illustrating an example of a table structure of data related to a business negotiation out of the business data held by the data management unit 406 of the cloud platform service 102. The business data is managed in a data table 800, and the data table 800 includes a business negotiation table 801 and a product table 811. The business negotiation table 801 includes a record ID 802 and a business negotiation name 803. The record ID 802 is an identifier of a record. To the business negotiation name 803, any name can be set so that a user can easily distinguish records. The product table 811 includes a business negotiation record ID 812, a record ID 813 that is an identifier of a record of the product table, a product name 814, a quantity 815, and a price 816. The business negotiation record ID 812 is related to the record ID 802 of the business negotiation table.

Figure 9:
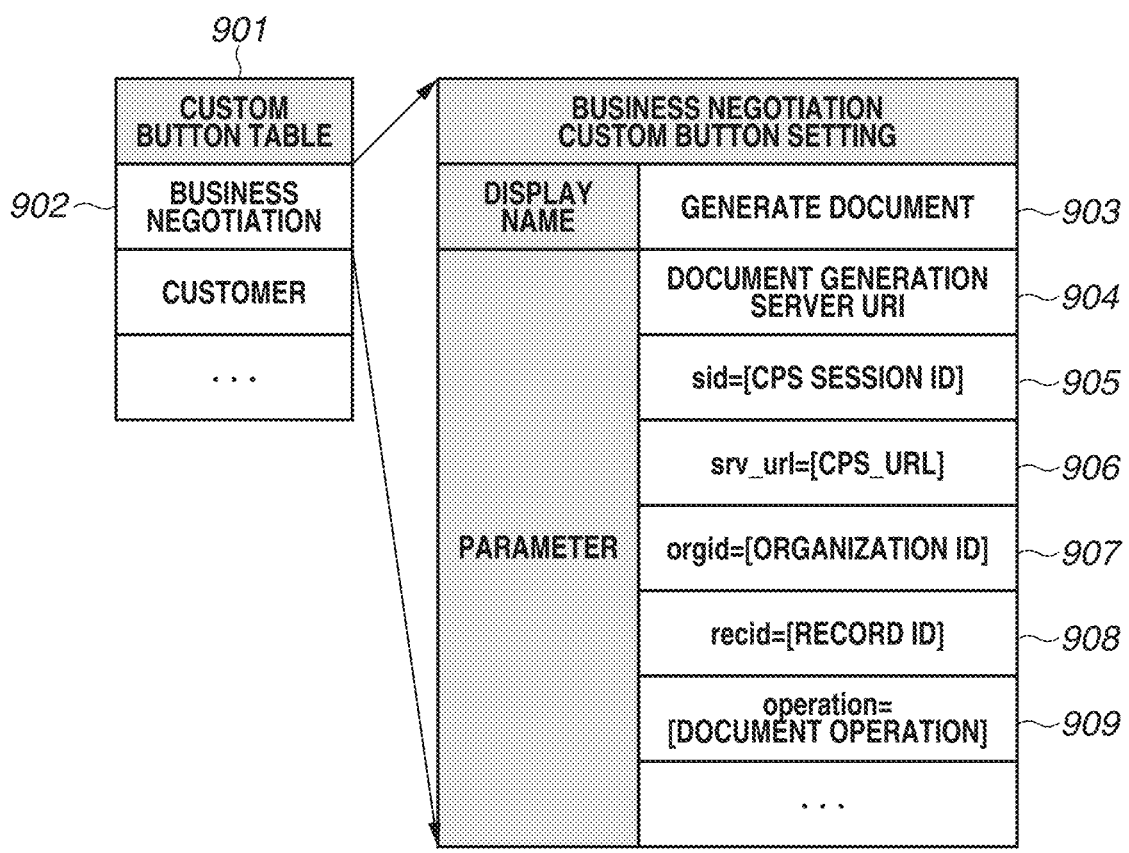
FIG. 9 is example definition information of custom buttons of the cloud platform service according to one embodiment.

FIG. 9 is a diagram illustrating an example of definition information of custom buttons held by the setting management unit 407 of the cloud platform service 102. In FIG. 9, the custom buttons are defined for the "business negotiation" screen and the "customer" screen, and setting information of the custom button displayed on the "business negotiation" screen includes a button display name and parameter information used for redirection to the document generation server 103. A document generation server Uniform Resource Identifier (URI) 904 is a parameter in which the URI of the document generation server 103 is specified in the format of "http://~". A session ID 905 is a character string "sid=<session ID>" to be added to a Uniform Resource Locator (URL) parameter. The session ID 905 is a session ID of a logged in user that has been acquired. A CPSURL 906 is a character string "srv_url=<cloud platform service URL>" to be added to the URL parameter. The character string indicates a URL used by the document generation server 103 to access the cloud platform service 102.

The URL for accessing the cloud platform service 102 is unique to each organization. At the time of user authentication, the control unit 402 acquires a URL corresponding to the organization to which the user belongs and stores the URL in the session management unit 404. An organization ID 907 is a character string setting "orgid=<organization ID>" to be added to the URL parameter. The organization ID 907 is an organization ID of a logged in user that has been acquired. A record ID 908 is a character string "recid=<record ID>" to be added to the URL parameter. The record ID 908 is a record ID 1202 of a business negotiation record displayed on a screen that has been acquired. A document operation 909 is a parameter for specifying a transmission destination of a generated document. As a value of the document operation 909, for example, "print" is set in a case where a document is transmitted to the document print server 104, and "attach" is set in a case where a document is transmitted to the cloud platform service 102. In this manner, it is possible to specify, using the parameter, whether to transmit a document to a print service.

Figure 10:
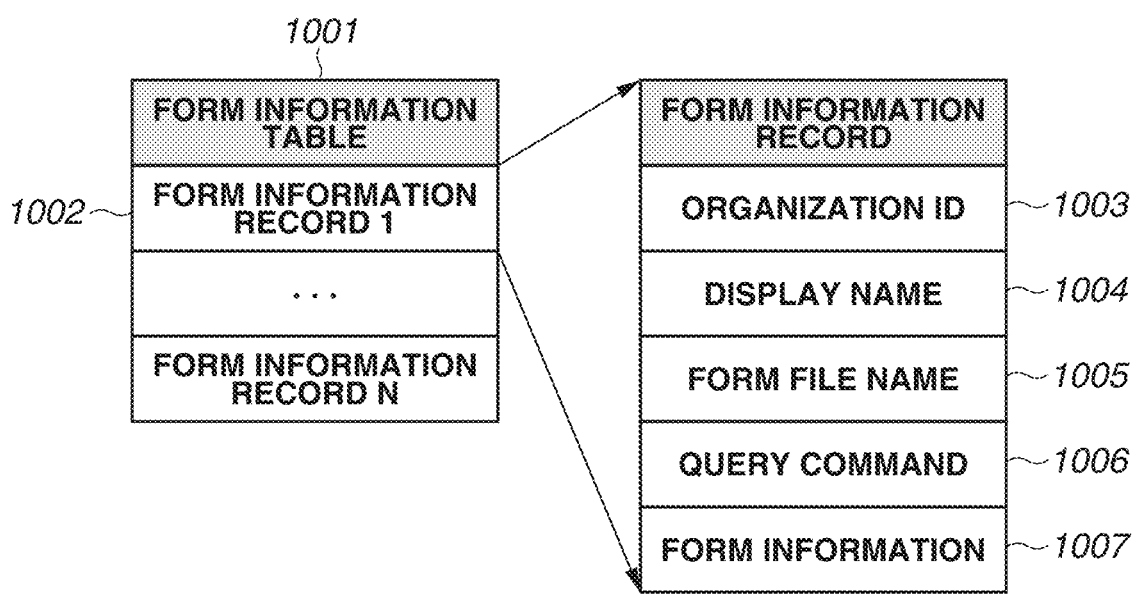
FIG. 10 is a diagram illustrating a table structure of a form information table according to one embodiment.

FIG. 10 is a diagram illustrating a table structure of the form information table held by the form information management unit 504 of the document generation server 103. A form information record of a form information table 1001 includes an organization ID 1003 for identifying an organization that is an owner of the record, a display name 1004 that is a name to be displayed on a form selection screen, a form file name 1005 that is a file name of a form managed by the form management unit 505 of the document generation server 103, a query command 1006 that describes a query for acquiring data from the cloud platform service 102, and form information 1007 that is information on fixed data defined in the form file.

FIG. 14 is a diagram illustrating a table structure of the document information table held by the document information management unit 508 of the document generation server 103. A document information record of the document information table 1401 includes a document ID 1402 for identifying a document, a processing status 1403 indicating a progress status of document generation processing and document transmission processing, and a storage path 1404 of document data stored in the document management unit 509.

Figure 11:
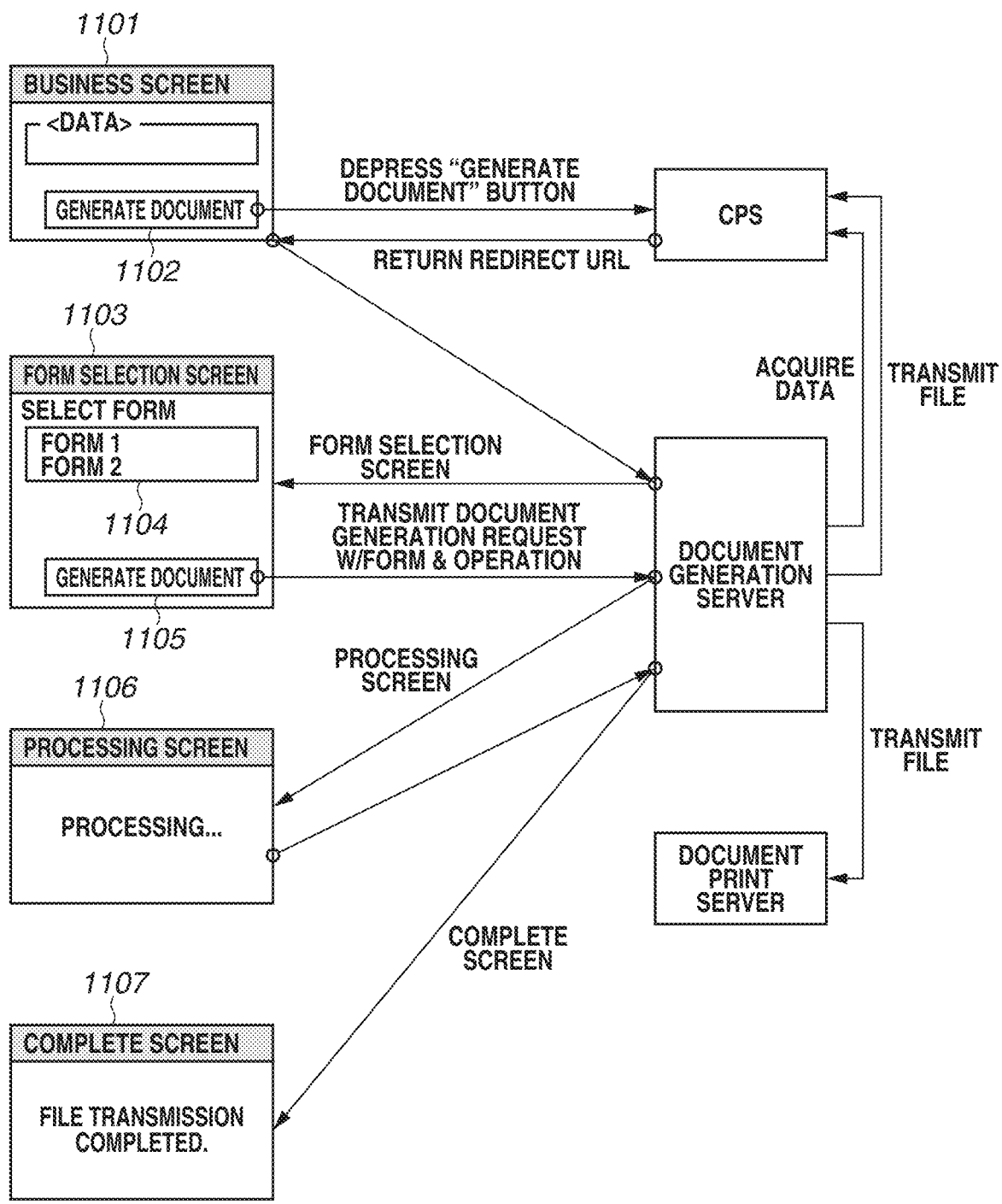
FIG. 11 is a diagram illustrating screen transition displayed on a Web browser according to one embodiment.

FIG. 11 is a diagram illustrating screen transition displayed on the Web browser 301 of the client device 101 in the document system of FIG. 1. In the figures described below, the cloud platform service 102 is abbreviated as CPS. A business screen 1101 is a screen created by the cloud platform service 102 and returned to the client device 101. On the business screen 1101, the business screen 701 of FIG. 7 is displayed, for example. A generate document button 1102 is a button for issuing a document generation request to the cloud platform service 102.

When the generate document button 1102 is depressed, the cloud platform service 102 returns a URL for redirection (hereinafter referred to as a redirect URL) to the document generation server 103. Upon receiving the redirect URL, the Web browser 301 of the client device 101 redirects a user to the document generation server 103 according to this URL. Upon receiving a request, the document generation server 103 returns a form selection screen 1103 to the Web browser 301 of the client device 101. The form selection screen 1103 has a selection form 1104 for allowing a form to be used for document generation to be selected.

Upon receiving a selection result of the selection form 1104 from the user depressing the generate document button 1105, the Web browser 301 of the client device 101 transmits a document generation request to the document generation server 103 together with the selection result of the selection form 1104. At this time, the Web browser 301 of the client device 101 transmits the session ID 905, the CPSURL 906, the record ID 908, and the document operation 909 included in the redirect URL to the document generation server 103. Upon receiving these pieces of information, the document generation server 103 acquires the business data on the business screen 1101 from the cloud platform service 102.

Upon completion of acquisition of the business data from the cloud platform service 102, the document generation server 103 performs document generation processing using the acquired business data and the selected form. Upon completion of the document generation processing, the document generation server 103 transmits the generated document to the cloud platform service 102 or the document print server 104 based on the document operation 909. During the document generation processing and the document transmission processing, the Web browser 301 of the client device 101 displays a processing screen 1106. Upon completion of the creation and transmission of the document, the Web browser 301 of the client device 101 displays a complete screen 1107.

Figure 12:
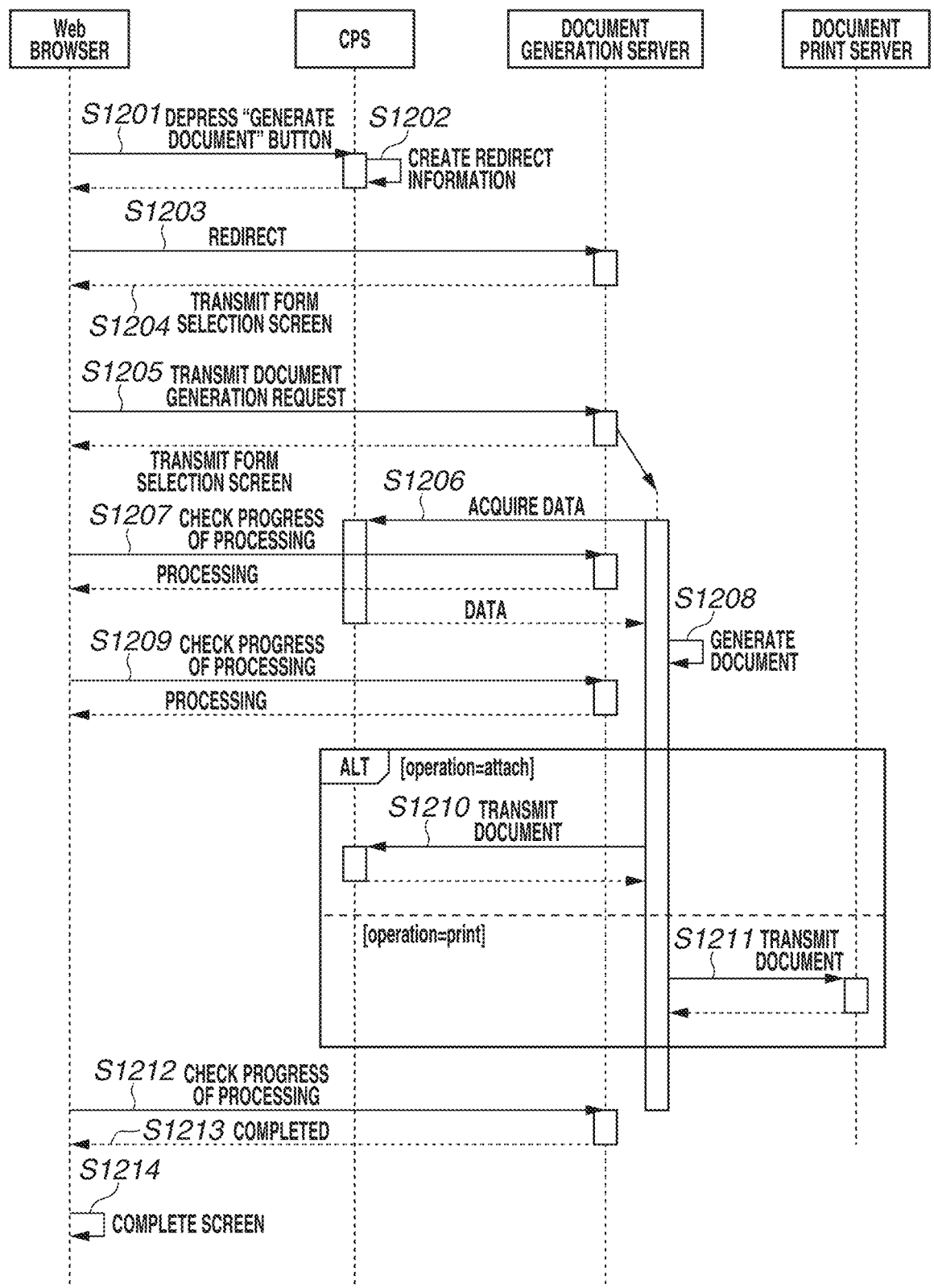
FIG. 12 is a diagram illustrating a processing sequence performed by the document generation system according to a first exemplary embodiment.

FIG. 12 illustrates a process sequence diagram performed by the document generation system according to the present exemplary embodiment. It is assumed here that the user has logged in to the cloud platform service 102 from a login screen (not illustrated), the business screen 701 of FIG. 7 is displayed on the Web browser 301, and the custom button 704 is previously set as illustrated in FIG. 9.

When the custom button 704 of the business screen 701 displayed on the Web browser 301 of the client device 101 is depressed by the user in step S1201, the cloud platform service 102 performs redirect URL creation processing in step S1202.

In step S1202, the control unit 402 acquires the document generation server URI 904, the session ID 905, the CPSURL 906, the organization ID 907, the record ID 908, and the document operation 909 set to the custom button 704. The control unit 402 adds the acquired values to the URL parameter to create a redirect URL. The control unit 402 then returns a response for redirection to the Web browser 301.

Upon receipt of the response returned from the cloud platform service 102, the Web browser 301 redirects the user to the document generation server 103 in step S1203. In step S1204, the document generation server 103 acquires a list of the display names 1004 of forms included in form information records 1002 from the form information management unit 504. The document generation server 103 then creates the form selection screen 1103 using the list of the display names 1004 of the forms and transmits the form selection screen 1103 to the client device 101.

When the user selects a form in the selection form 1104 on the form selection screen 1103 and depresses the generate document button 1105, the Web browser 301 transmits a document generation request to the document generation server 103 in step S1205. At this time, the Web browser 301 transmits the selection form 1104, the session ID 905, the CPSURL 906, the organization ID 907, the record ID 908, and the document operation 909. The session ID 905, the CPSURL 906, the organization ID 907, the record ID 908, and the document operation 909 are acquired front the parameters included in the redirect URL.

Upon receipt of the document generation request, the document generation server 103 generates a document ID and creates a document information record in the document information table 1401 by setting the generated document ID to the document ID 1402 and "processing" to the processing status 1403. Thereafter, the document generation server 103 returns the processing screen 1106 to the Web browser 301. At this time, the generated document ID is included in the response. In step S1206, the document generation server 103 issues a query command 1006 that matches the form specified in the selection form 1104. Upon receipt of a response to the data acquisition from the cloud platform service 102, the document generation server 103 performs document generation processing and document transmission processing to be described below in step S1208, and in step S1210 or step S1211.

In step S1207, step S1209, or step S1212, the Web browser 301 periodically transmits a processing progress check request to the document generation server 103. At this time, the document ID returned in the response to the document generation request in step S1205 is included in the request. The document generation server 103 acquires the processing status 1403 of the document ID included in the request and returns the processing status 1403. Based on the returned status, the Web browser 301 displays the processing screen 1106 or the complete screen 1107. When, in step S1213, the document generation server 103 returns a processing status "completed" in the response to the processing progress check request in step S1212, the Web browser 301 displays the complete screen 1107 in step S1214.

Figure 13:
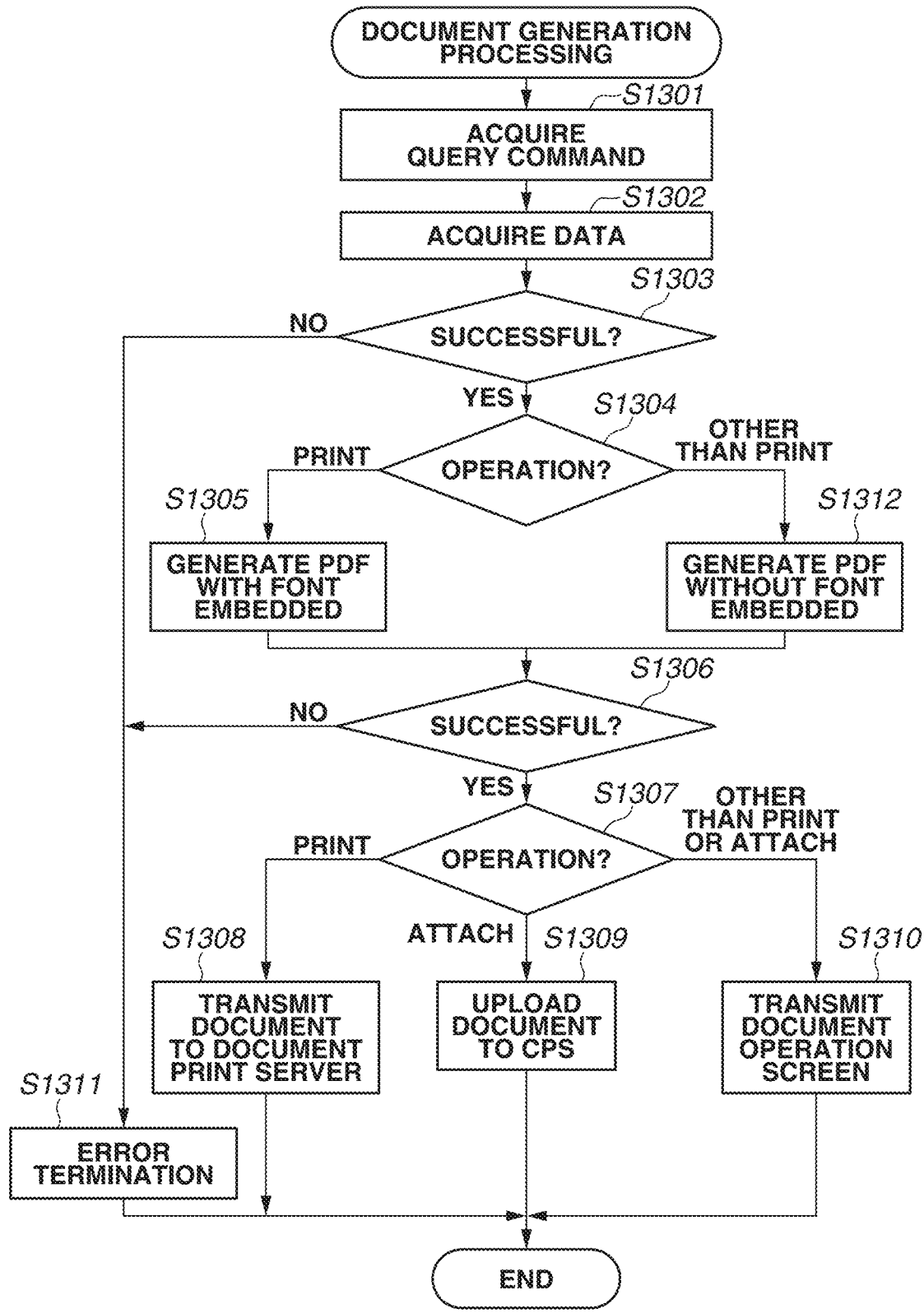
FIG. 13 is a flowchart illustrating document generation processing of the document generation server according to the first exemplary embodiment.

FIG. 13 is a flowchart illustrating the document generation processing performed by the document generation server 103 according to the present exemplary embodiment. This processing starts when the Web browser 301 transmits a document generation request to the document generation server 103.

Upon receipt of the document generation request, the control unit 502 acquires the query command 1006 of the selection form 1104 included in the request from the form information table 1001 of the form management unit 505 in step S1301. In step S1302, the data access unit 506 issues the acquired query command 1006 to acquire data from the cloud platform service 102. At this time, the data access unit 506 specifies the session ID 905 as user information and transmits a request to the CPSURL 906. In step S1303, the control unit 502 determines whether data acquisition is successful.

In a case where the control unit 502 determines that the data acquisition is successful (YES in step S1303), the control unit 502 determines a value of the document operation 909 included in the request in step S1304. In a case where the control unit 502 determines that the value of the document operation 909 is "print" (PRINT in step S1304), the document generation unit 507 generates a PDF document with font data embedded therein in step S1305. In a case where the control unit 502 determines that the value of the document operation 909 is not "print" (OTHER THAN PRINT in step S1304), the document generation unit 507 generates a PDF document without font data embedded therein in step S1312. The value of the document operation 909 is not limited to "print", but can be a value indicating that the transmission destination of the PDF document is the document print server.

In step S1306, the control unit 502 determines whether the generation of the PDF document is successful. If the control unit 502 determines that the generation of the PDF document is successful (YES in step S1306), the control unit 502 determines the value of the document operation 909 in step S1307. In a case where the control unit 502 determines, in step S1307, that the value of the document operation 909 is "print" (PRINT in step S1307), the document transmission unit 606 transmits the PDF document to the document print server 104 in step S1308. In a case where the control unit 502 determines that the value of the document operation 909 is "attach" (ATTACH in step S1307), the document transmission unit 606 transmits the PDF document to the cloud platform service 102 in step S1309. In a case where the control unit 502 determines that the document operation 909 is not set or the value of the document operation 909 is other than "print" or "attach" (OTHER THAN PRINT OR ATTACH in step S1307), the control unit 502 transmits a document operation screen (not illustrated) to the Web browser 301 (step S1310). The document operation screen includes a menu that allows a user to select whether a PDF document is transmitted to the Web browser 301 or transmitted to the cloud platform service 102. On the document operation screen, the user can display the PDF document on the Web browser 301 and check the contents. In that case, after checking the contents of the PDF document, the user selects to store the PDF document in the client device 101 or to transmit the PDF document to the cloud platform service 102.

In a case where the control unit 502 determines, in step S1303, that the data acquisition has failed (NO in step S1303), or the control unit 502 determines, in step S1306, that the PDF document generation has failed (NO in step S1306), the document generation processing is terminated in error in step S1311. Through the processing described above, the document generation server 103 performs the document generation processing.

In this exemplary embodiment, whether to embed font data is determined using the transmission destination of the PDF document, but it can be determined in other ways. For example, it can be determined using a parameter that specifies a function or use such as "for printing" or "for storing". Any parameter can be used as long as whether the PDF document is transmitted to a document print service can be determined based on the parameter. In addition, in the first exemplary embodiment, the document operation 909 is specified using the custom button 704, but it can be specified in other ways. For example, document operations can be displayed on the form selection screen 1103 in a manner that a user can select a document operation therefrom, and, when the user depresses the generate document button 1105, the Web browser 301 can transmit a document generation request in step S1205 with specification of the selected document operation.

According to the present exemplary embodiment, whether to embed font data in a PDF document can be determined based on the destination of the document. Thus, in a case where a PDF document is transmitted to the cloud platform service, consumption of the storage capacity can be suppressed, and in a case where a PDF document is transmitted to a print service, an intended print output result can be obtained.

In the first exemplary embodiment, a PDF document without font data embedded therein is generated in a case where the destination of the document is not the document print server. In a second exemplary embodiment, a method for embedding font data in a PDF document depending on a condition even if the destination of a document is not the document print server will be described.

First, it is assumed that settings related to font embedment control are held in form data. When a user edits form data, the user specifies a font to be embedded in the PDF document. In the present exemplary embodiment, it is assumed that the form management unit 505 of the document generation server 103 manages form data in which the font to be embedded is specified. The second exemplary embodiment will be described with reference to the drawings. The description of the parts similar to those of the first exemplary embodiment will not be described, and only parts different from the first exemplary embodiment will be described below.

Figure 15:
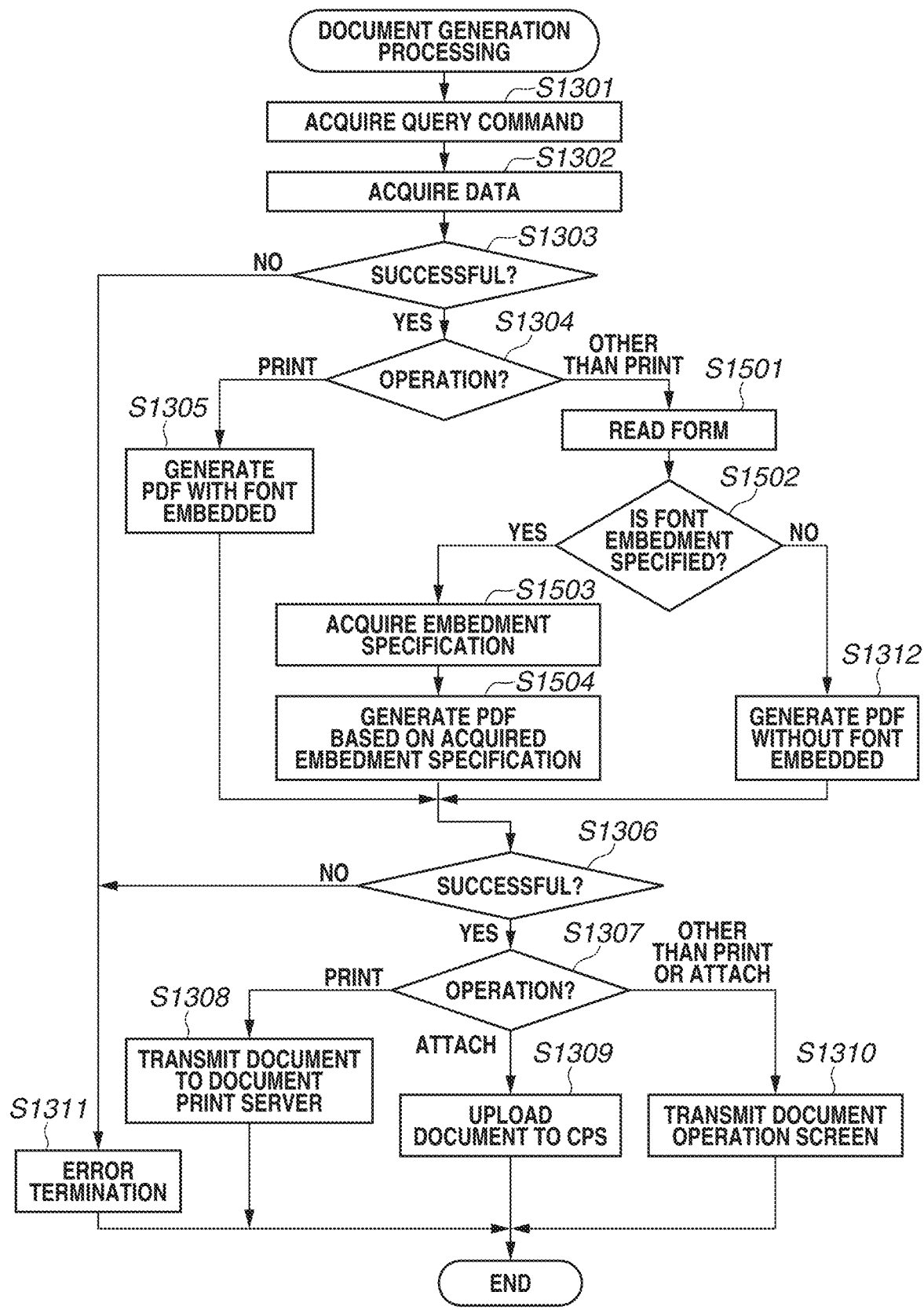
FIG. 15 is a flowchart illustrating document generation processing of the document generation server according to a second exemplary embodiment.

FIG. 15 is a flowchart illustrating document generation processing of the document generation server 103 according to the second exemplary embodiment. This processing starts when the Web browser 301 transmits a document generation request to the document generation server 103.

Upon receipt of the document generation request, in step S1301, the control unit 502 acquires the query command 1006 of the selection form 1104 included in the request from the form information table 1001 of the form management unit 505. In step S1302, the data access unit 506 issues the acquired query command 1006 to acquire data from the cloud platform service 102. At this time, the data access unit 506 specifies the session ID 905 as the user information and transmits a request to the CPSURL 906. In step S1303, the control unit 502 determines whether data acquisition is successful.

In a case where the control unit 502 determines that the data acquisition is successful (YES in step S1303), the control unit 502 determines a value of the document operation 909 included in the request in step S1304. In a case where the control unit 502 determines that the value of the document operation 909 is "print" (PRINT in step S1304), the document generation unit 507 generates a PDF document with font data embedded therein in step S1305.

In a case where the control unit 502 determines, in step S1304, that the value of the document operation 909 is not "print" (OTHER THAN PRINT in step S1304), the document generation unit 507 reads form data from the form management unit 505 in step S1501. In step S1502, the document generation unit 507 determines whether a font to be embedded is specified in the read form data.

In a case where the document generation unit 507 determines that a font to be embedded is specified in the form data (YES in step S1502), the document generation unit 507 acquires specification of a font to be embedded from the form data in step S1503. In step S1504, the document generation unit 507 generates a PDF document in which font data specified by the acquired specification of font to be embedded is embedded.

In a case where the document generation unit 507 determines, in step S1502, that a font to be embedded is not specified in the form data (NO in step S1502), the document generation unit 507 generates a PDF document without the font data embedded therein in step S1312.

According to the present exemplary embodiment, when the transmission destination of a document is not the document print server, whether to embed font data in the PDF document is determined according to the setting related to the font embedment control in the form data. Thus, when a PDF document transmitted to the cloud platform service is browsed, constant display can be provided regardless of the browsing environment by generating the PDF document with use of form data having specification of a font to be embedded.

In the first exemplary embodiment and the second exemplary embodiment, an instruction to print a PDF document is issued at the time of generating the PDF document. In a third exemplary embodiment, even in a case where the generated PDF document is transmitted to the cloud platform service 102, the transmitted PDF document can be transmitted to the document print server 104 to be printed afterward. The third exemplary embodiment will be described with reference to the drawings. The description of the parts similar to those described in the first and second exemplary embodiments will not be described, and only parts different from the first and second exemplary embodiments will be described below.

FIG. 16 is a diagram illustrating a table structure of an Attachment table held by the DB 408 of the cloud platform service 102. An Attachment table 1601 is a table for managing files having been transmitted to the cloud platform service 102. An Attachment record of the Attachment table 1601 includes data items described below.

The Attachment record includes an ID 1602 that identifies a file that is automatically assigned by the cloud platform service 102, a name 1603 that is a file name of the stored file, a body 1604 that holds an entity of the stored file in binary form, that is, for example, a value encoded in the Base64 format, a size 1605 which is the size of the stored file, and a description 1606 to which any character string such as description of the stored file can be set.

Figure 17:
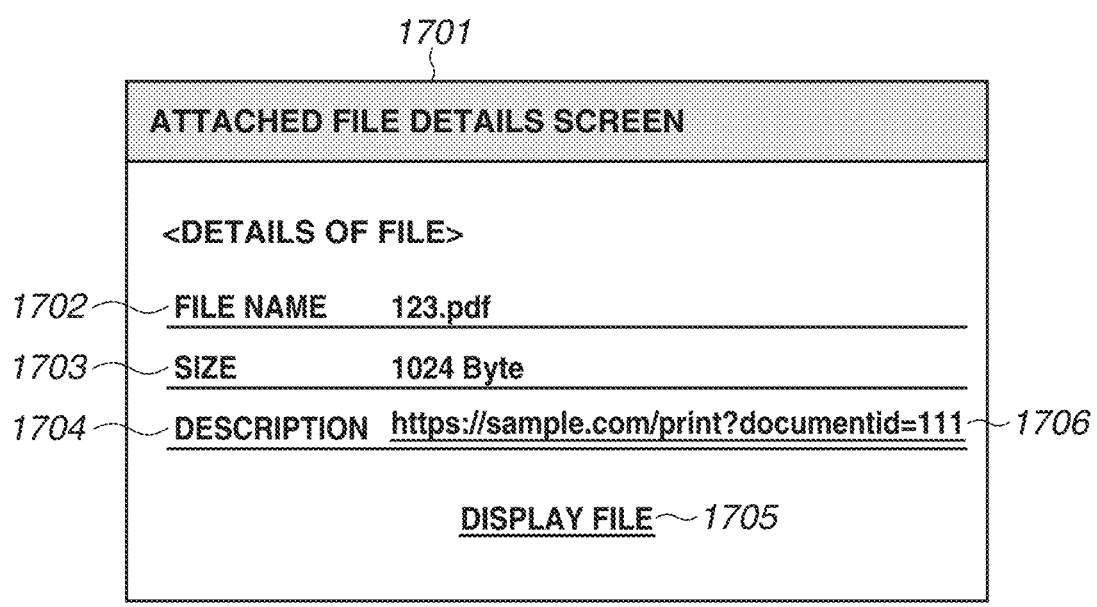
FIG. 17 is an example of an attached file details screen of the cloud platform service according to one embodiment.

FIG. 17 is an example of an attached file details screen 1701 when the Web browser 301 of the client device 101 accesses the cloud platform service 102 and one record in the Attachment table 1601 is displayed. FIG. 17 illustrates a record 1607 having an ID "aaa" in FIG. 16.

Figure 18:
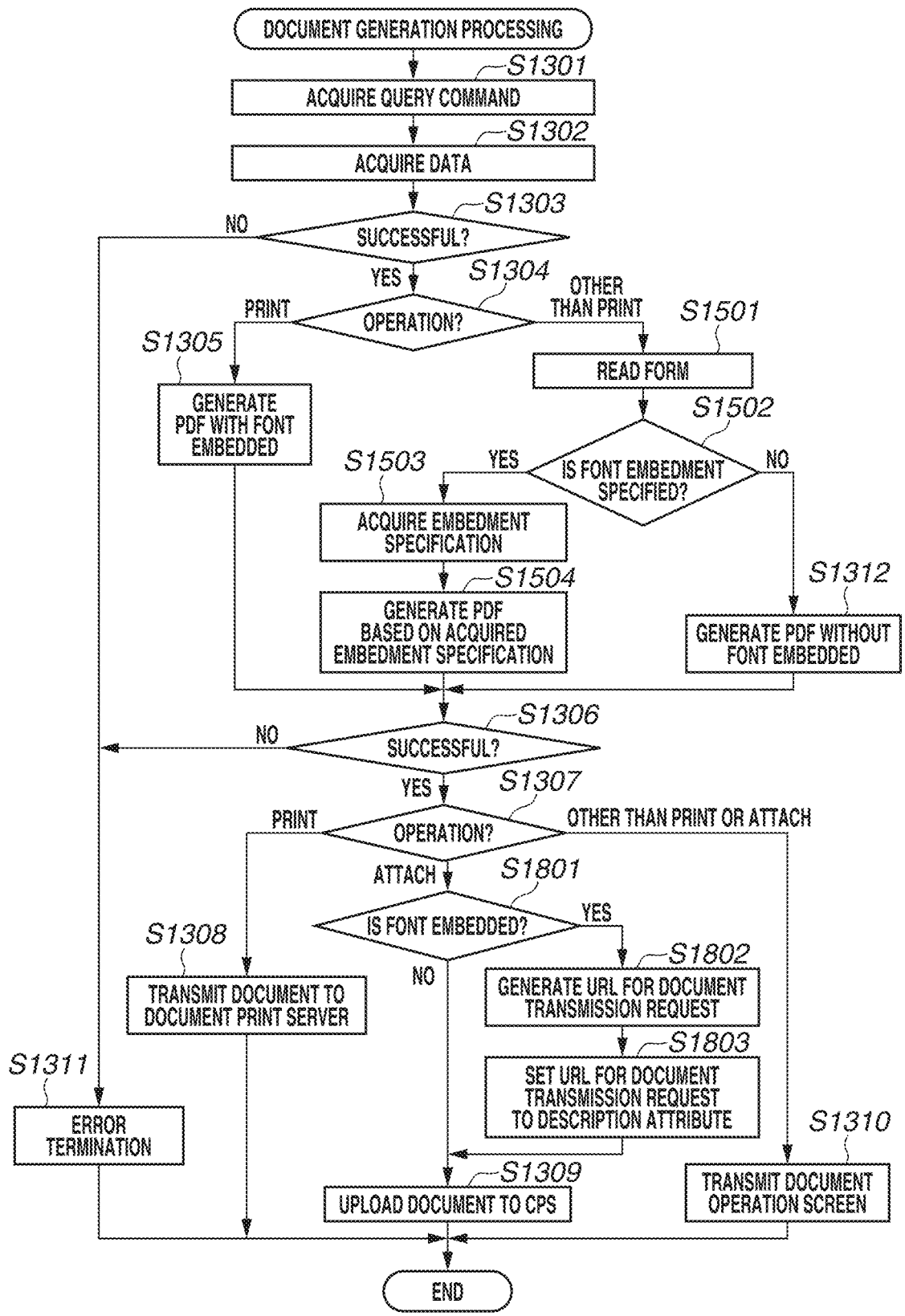
FIG. 18 is a flowchart illustrating document generation processing of the document generation server according to a third exemplary embodiment.

FIG. 18 is a flowchart illustrating document generation processing of the document generation server 103 according to the third exemplary embodiment. This processing starts when the Web browser 301 transmits a document generation request to the document generation server 103.

In step S1307, the control unit 502 determines the value of the document operation 909.

In a case where the control unit 502 determines, in step S1307, that the value of the document operation 909 is "attach" (ATTACH in step S1307), the control unit 502 determines whether font data is embedded in the generated PDF document in step S1801.

In a case where the control unit 502 determines, in step S1801, that font data is embedded in the generated PDF document (YES in step S1801), the control unit 502 generates a document transmission request URL in step S1802. The document transmission request URL is a URL for transmitting the generated PDF document to the document print server 104. When the URL is accessed, the document generation server 103 accepts the access, acquires the document from the document management unit 509, and transmits the document to the document print server 104. The control unit 502 adds the document ID 1402 of the generated PDF document to the document transmission request URL. In step S1803, the control unit 502 then specifies the entity of the generated PDF document to the body 1604 of the Attachment record, and specifies the generated document transmission request URL to the description 1606. In step S1309, the document transmission unit 606 transmits the Attachment record to the cloud platform service 102.

In a case where the control unit 502 determines, in step S1801, that font data is not embedded in the generated PDF document (NO in step S1801), the control unit 502 specifies the entity of the generated PDF document to the body 1604 of the Attachment record. The document transmission unit 606 then transmits the Attachment record to the cloud platform service 102.

When the above-described processing is performed, the following operations are realized. When a PDF document with font data embedded therein is transmitted to the cloud platform service 102, the attached file details screen 1701 is displayed as illustrated in FIG. 17. In FIG. 17, a link of a document transmission request URL 1706 is displayed in the field of a description 1704.

Figure 19:
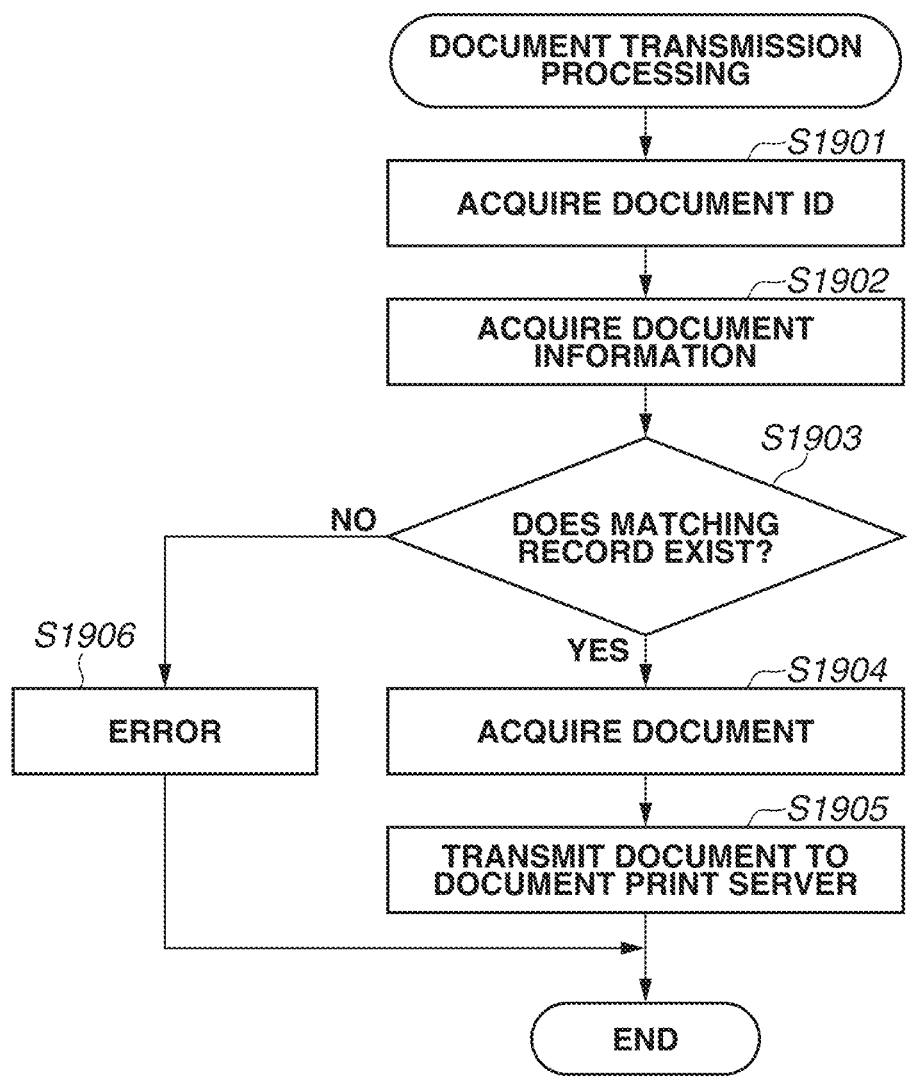
FIG. 19 is a flowchart illustrating document transmission processing of the document generation server according to the third exemplary embodiment.

FIG. 19 is a flowchart illustrating document transmission processing of the document generation server 103 according to the third exemplary embodiment. This processing starts when a user clicks the link of the document transmission request URL 1706 on the attached file details screen 1701, and the Web browser 301 then accesses the document generation server 103 to transmit a request including information set in the document transmission request URL 1706.

When the document generation server 103 accepts an access, the control unit 502 acquires a document ID included in the request in step S1901. In step S1902, the control unit 502 requests the document information management unit 508 to acquire document information with specification of the document ID acquired in step S1901. The document information management unit 508 retrieves a record having a value in the document ID 1402 that matches the specified document ID from the document information table 1401 and returns the record.

In step S1903, the control unit 502 then determines whether a matching record exists. In a case where the control unit 502 determines that a matching record exists (YES in step S1903), the control unit 502 acquires, in step S1904, a PDF document from the document management unit 509 with specification of the storage path 1404 of the document information record acquired in step S1902. Thus, the document corresponding to the document ID is acquired. In step S1905, the document transmission unit 606 then transmits the acquired PDF document to the document print server 104.

Through the processing described above, the document generation server 103 performs the document transmission processing. At this time, the font data is embedded in the PDF document to be transmitted. Thus, the intended print output result can be obtained.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-211220, filed Oct. 31, 2017, which is hereby incorporated by reference herein in its entirety.

What is claimed is:

1. A document system including a client, a document generation service system configured to generate a document, a data management system configured to manage data, and a print service system configured to cause a printer to print the document, the document system comprising:
   at least one processor and at least one memory coupled to the at least one processor and having stored thereon instructions which, when executed by the at least one processor, cause the document system to act as:
   a determination unit configured to, in response to receiving a request for generating the document from the client, determine whether a parameter specified by the client is an instruction to transmit the generated document to the print service system; and
   a generation unit configured to generate the document with a font embedded therein in a case where the determination unit determines that the parameter indicates an instruction to transmit the generated document to the print service system, and configured to generate the document without the font embedded therein in a case where the determination unit determines that the parameter indicates an instruction to transmit the generated document to the data management system.

2. The document system according to claim 1, wherein in a case where the generation unit has generated the document with the font embedded therein, the document is transmitted to the print service system, and in a case where the generation unit has generated the document without the font embedded therein, the document is transmitted to a service system other than the print service system or a document operation screen for operating the document is transmitted to the client.

3. The document system according to claim 1, wherein when a user using the client issues an instruction to generate the document via a business screen for issuing an instruction to generate the document, the parameter included in an URL set on the business screen is transmitted from the client to the document generation service system including the determination unit.

4. The document system according to claim 1, wherein the generation unit acquires form data of a form specified by the client and data to be an object of document generation, and performs overlay processing based on both of the form data and the data to generate the document.

5. The document system according to claim 4,
   wherein, after determining that the parameter is not an instruction to transmit the generated document to the print service system, the determination unit further determines whether the form data includes a specification of embedding the font, and
   wherein, in a case where the determination unit determines that the form data includes a specification of embedding the font, the generation unit generates the document with the font embedded therein.

6. The document system according to claim 5, wherein, in a case where the determination unit determines that the form data does not include a specification of embedding the font, the generation unit generates the document without the font embedded therein.

7. The document system according to claim 5, wherein, in a case where the determination unit determines that the form data includes a specification of embedding the font and the generation unit generates the document with the font embedded therein, a document transmission request URL is generated and transmitted together with the document in transmitting the document to a service system other than the print service system.

8. The document system according to claim 7, wherein, upon accepting from the client an access with a parameter of an ID of the document included in the document transmission request URL, the document generation service system transmits the document corresponding to the ID to the print service system.

9. A method of controlling a document system including a client, a document generation service system configured to generate a document, a data management system configured to manage data, and a print service system configured to cause a printer to print the document, the method comprising:

determining, in response to receiving a request for generating the document from the client, whether a parameter specified by the client is an instruction to transmit the generated document to the print service system; and generating the document with a font embedded therein in a case where the determining determines that the parameter indicates an instruction to transmit the generated document to the print service system, and generating the document without the font embedded therein in a case where the determining determines that the parameter indicates an instruction to transmit the generated document to the data management system.

10. A non-transitory storage medium storing a program for causing a computer to execute a method of controlling a document system including a client, a document generation service system configured to generate a document, a data management system configured to manage data, and a print service system configured to cause a printer to print the document, the method comprising:

determining, in response to receiving a request for generating the document from the client, whether a parameter specified by the client is an instruction to transmit the generated document to the print service system; and generating the document with a font embedded therein in a case where the determining determines that the parameter indicates an instruction to transmit the generated document to the print service system, and generating the document without the font embedded therein in a case where the determining determines that the parameter indicates an instruction to transmit the generated document to the data management system.

* * * * *